United States Patent [19]

Hosaka et al.

[11] Patent Number: 5,467,642
[45] Date of Patent: Nov. 21, 1995

[54] SCANNING PROBE MICROSCOPE AND METHOD OF CONTROL ERROR CORRECTION

[75] Inventors: Sumio Hosaka, Tokyo; Atsushi Kikugawa, Kokubunji; Yukio Honda, Fuchu; Hajime Koyanagi, Koshigaya; Kiyosi Nagasawa, Ibaraki, all of Japan

[73] Assignees: Hitachi, Ltd.; Hitachi Construction Machinery, Ltd., both of Tokyo, Japan

[21] Appl. No.: 145,600

[22] Filed: Nov. 4, 1993

[30] Foreign Application Priority Data

Nov. 6, 1992 [JP] Japan ................................. 4-296728

[51] Int. Cl.$^6$ ................................................. G01B 5/28
[52] U.S. Cl. ............................................... 73/105; 250/306
[58] Field of Search ............................ 73/105; 250/306, 250/307

[56] References Cited

U.S. PATENT DOCUMENTS

| | | | |
|---|---|---|---|
| Re. 34,489 | 12/1993 | Hansma et al. | 250/306 |
| 4,724,318 | 2/1988 | Binnig | 250/306 |
| 4,935,634 | 6/1990 | Hansma et al. | 250/306 |
| 5,038,322 | 8/1991 | Van Loenen | 250/306 |
| 5,059,793 | 10/1991 | Miyamoto et al. | 250/307 |
| 5,066,858 | 11/1991 | Elings et al. | 250/307 |
| 5,144,128 | 9/1992 | Hasegawa et al. | 250/306 |
| 5,229,607 | 7/1993 | Matsui et al. | 250/306 |
| 5,237,859 | 8/1993 | Elings et al. | 73/105 |
| 5,241,527 | 8/1993 | Eguchi et al. | 250/306 |
| 5,245,863 | 9/1993 | Kajimura et al. | 73/105 |
| 5,262,643 | 11/1993 | Hammond et al. | 73/105 |

FOREIGN PATENT DOCUMENTS 0441311 2/1991 European Pat. Off. .

OTHER PUBLICATIONS

"Control Electronics For Atomic Force Microscopy", By O. Marti et al., Review of Scientific Instruments, vol. 59, No. 6, Jun. 1988, New York, N.Y., USA, pp. 836–839.

"Proximal Probes: Techniques For Measuring At The Nanometer Scale", By J. S. Murday and R. J. Colton, Materials Science & Engineering B, vol. B6, No. 2/3, Jun. 1990, Lausanne, CH, pp. 77–85.

"A High Stability And Low Drift Atomic Force Microscope", By H. J. Hug et al., Review of Scientific Instruments, vol. 63, No. 8, Aug. 1992, New York, N.Y., USA, pp. 3900–3904.

Gould et al., "From Atoms to Integrated Circuits Chips, Blood Cells, and Bacteria with the Atomic Force Microscope", *J. Vac. Sci. Technol.*, A8 (1), Jan./Feb. 1990, pp. 369–373.

Mamin et al., "Theromechanical Writing with an Atomic Force Microscope Tip", *Appl. Phys. Lett.*, 61(8), 24 Aug. 1992, pp. 1003–1005.

*Primary Examiner*—Hezron E. Williams
*Assistant Examiner*—Daniel S. Larkin
*Attorney, Agent, or Firm*—Antonelli, Terry, Stout & Kraus

[57] ABSTRACT

A scanning probe microscope in which the deflection of a cantilever caused by the proximity between a stylus and a sample is detected, the relative distance between the sample and a probe at which the level of the deflection detection signal coincides with a reference level is subjected to servo control thereby to control the force exerted on the stylus to a constant level, and the relative positions of the sample and the probe are scanned to produce a three-dimensional image of the surface of the sample. In order to eliminate the error of servo control attributable to the deformation of the cantilever, the deflection detection signal is held with the cantilever set in free standing state, and the signal thus held is used to correct the level of the cantilever deflection detection signal. The servo control is effected by the detection signal thus corrected.

26 Claims, 7 Drawing Sheets

ELONGATION OF Z-AXIS PIEZOELECTRIC ELEMENT

FIG. 3(b)

FEED DISTANCE BY INCHWORM MECHANISM

FIG. 3(c)

INPUT SIGNAL FOR SERVO CIRCUIT

SCANNING PROBE MICROSCOPE AND METHOD OF CONTROL ERROR CORRECTION

BACKGROUND OF THE INVENTION

The present invention relates to a scanning probe microscope for observing the structure and conditions of the surface of a sample by a stylus, or more in particular to a microscope for scanning the sample while controlling the deflection of a cantilever holding the stylus. The invention further relates typically to an atomic force microscope or a microscope for measuring the distribution of various physical properties as well as observing the forms of the sample surface, or further to an apparatus having the ability to finely process the medium surface for information storage.

What might be considered the first arrival of a scanning probe microscope was the scanning tunnel microscope (STM) developed in 1983. Since then, a succession of apparatuses were suggested. These apparatuses operate in such a manner that various types of solid probes are brought to the proximity of the sample surface on the order of nm, and the structure and the properties of the sample surface are observed or measured with a resolution on the atomic order by the use of various physical phenomena. Among them, U.S. Pat. No. 4,724,318 (JP-A-62-130302) discloses an atomic force microscope in which a very small force (repulsive and attractive forces) exerted between the sample and the stylus at the forward end of a cantilever is kept constant, that is, the deflection of the cantilever is measured and maintained at constant level by servo control, while the sample is scanned and the surface thereof observed.

Further, an atomic force microscope comprising a mechanism for detecting by magnifying the deflection of a cantilever by the laser beam deflection method is disclosed in the Journal of Vacuum Science & Technologies, AS, Jan/Feb (1990), pp. 369 to 373.

Also, Applied Physics Letters Vol. 61, No. 8 (Aug. 24, 1992), pp. 1003 to 1005 presents an apparatus having an information write function for forming pits representing information in the surface of a sample on the principle of the atomic force microscope and by heating the forward end of the probe by infrared laser beam, i.e., an information storage apparatus as an application of the principle of the atomic force microscope.

SUMMARY OF THE INVENTION

In a scanning probe microscope having a mechanism for detecting by magnifying the deflection of a cantilever by the laser beam deflection method, or in a related apparatus using the same principle, the displacement of the forward end probe due to the deflection of the cantilever can be detected in an approximate magnification of ×1000. On the other hand, the use of a very sensitive cantilever makes stable operation difficult in various points. The laser beam irradiated on the cantilever for detecting the deflection thereof has a heating effect, which may deflect the cantilever. This deflection is called the deflection in free standing state. The amount of deflection varies from one cantilever to another, and is affected by the environmental changes of such factors as ambient temperature. Especially, in the scanning probe microscope constructed to observe the sample surface in a vacuum, the degree of heat dissipation from the cantilever changes with the progress of evacuation, resulting in a great change in the deflection of the cantilever. The amount of deflection is also dependent on the aging i.e., varies in accordance with deterioration of the cantilever due to its long use.

In the case where the scanning probe microscope is driven with the deflection changed in the free standing state of the cantilever, the servo control for controlling the force between the stylus and the sample develops an error. In an extreme case, the probe may scan without any force applied to the stylus from the sample, or the sample or the probe may be damaged under an extraneous force which is exerted unexpectedly.

Accordingly, it is an object of the present invention to provide a scanning probe microscope in which the force exerted between the stylus at the forward end of the probe and the sample can be controlled accurately and thus the result of observation is obtained with a high reproducibility.

Another object of the invention is to provide a scanning probe microscope by which the surface of a sample can be observed in a vacuum.

A further object of the invention is to provide a scanning probe microscope for facilitating prompt preparations for sample observation.

According to one aspect of the invention, there is provided a scanning probe microscope comprising means for correcting the level of the output signal of a detector for detecting the deflection of the cantilever, so that the relative distance between the sample and the probe is subjected to servo control to secure coincidence between the corrected deflection detection signal and a predetermined reference level. More in particular, the scanning probe microscope according to the first aspect of the invention comprises means for storing the level of the output signal of the deflection detector in the free standing state of the cantilever with the stylus and the sample surface separated sufficiently from each other, and means for shifting the level of the output signal of the deflection detector in accordance with the stored level.

According to another aspect of the invention, there is provided a scanning probe microscope comprising means for fetching the level of the output signal of the deflection detector with the cantilever in free standing state and calculating the reference level of a servo control with the particular level as a new baseline level.

The aforementioned correction means assures accurate and rapid correction of the error of the servo control which may be caused by the deflection of the cantilever.

According to still another aspect of the invention, there is provided a scanning probe microscope comprising a mechanism for finely adjusting the mounting position of the cantilever and/or the mounting position of the deflection detector and thereby adjusting the level of the output signal of the deflection detector with the cantilever in free standing state toward a predetermined baseline level. In the case where a detector of a laser beam deflection type is used as the deflection detector, the mounting position of a light position detector for detecting the position of the laser beam reflected from the cantilever is finely adjusted thereby to adjust the level of the output signal of the deflection detector toward a predetermined reference level. Fine adjustment of the mounting position of the cantilever is made possible by mounting the cantilever on a base through a piezoelectric element and applying a voltage to the piezoelectric element. The mechanical correction of this mechanism is somewhat inferior in the accuracy and rapidity of correction to the electrical correction with the above-mentioned correction means. Nevertheless, the mechanical correction may become necessary if a large deflection is caused in the cantilever. In other words, the error contained in the output signal of the deflection detector is first reduced within the correction range of the electrical correction means by mechanical correction, and then the electrical correction is applied as a final precise correction. Especially, in the case of the scanning probe microscope operated in vacuum, the electrical correction is conveniently effected after evacuation following the mechanical correction before evacuation.

The preparation for observation with a new sample set in the apparatus is made in accordance with the following procedure. First, the position setting means for setting the relative distance (feed distance) between the probe and the sample is activated to bring the stylus close to the sample surface. When the stylus senses the sample surface, the operation of the position setting means is reversed and the feed distance is reduced by a predetermined length, thereby setting the cantilever in free standing state. Under this condition, the output signal of the deflection detector is corrected by the mechanical correction and/or the electrical correction means. After that, the stylus is brought again to a position close to the sample surface, and the feed distance is increased continuously for a predetermined length of time following the sensing of the sample surface by the stylus. The position setting means is secured to complete the preparation for observation. This procedure removes the error of servo control due to the deformation of the cantilever, and prepares for the control with constant force within the proper control range of the actuator under servo control. The result of observation of a sample can thus be obtained with reproducibility. Alternatively, the preparation for observation can be made automatically by a configuration with sequence control.

The above and other objects, features and advantages will be made apparent by the detailed description taken in conjunction with the accompanying drawings.

DESCRIPTION OF THE PREFERRED EMBODIMENTS

Figure 1:
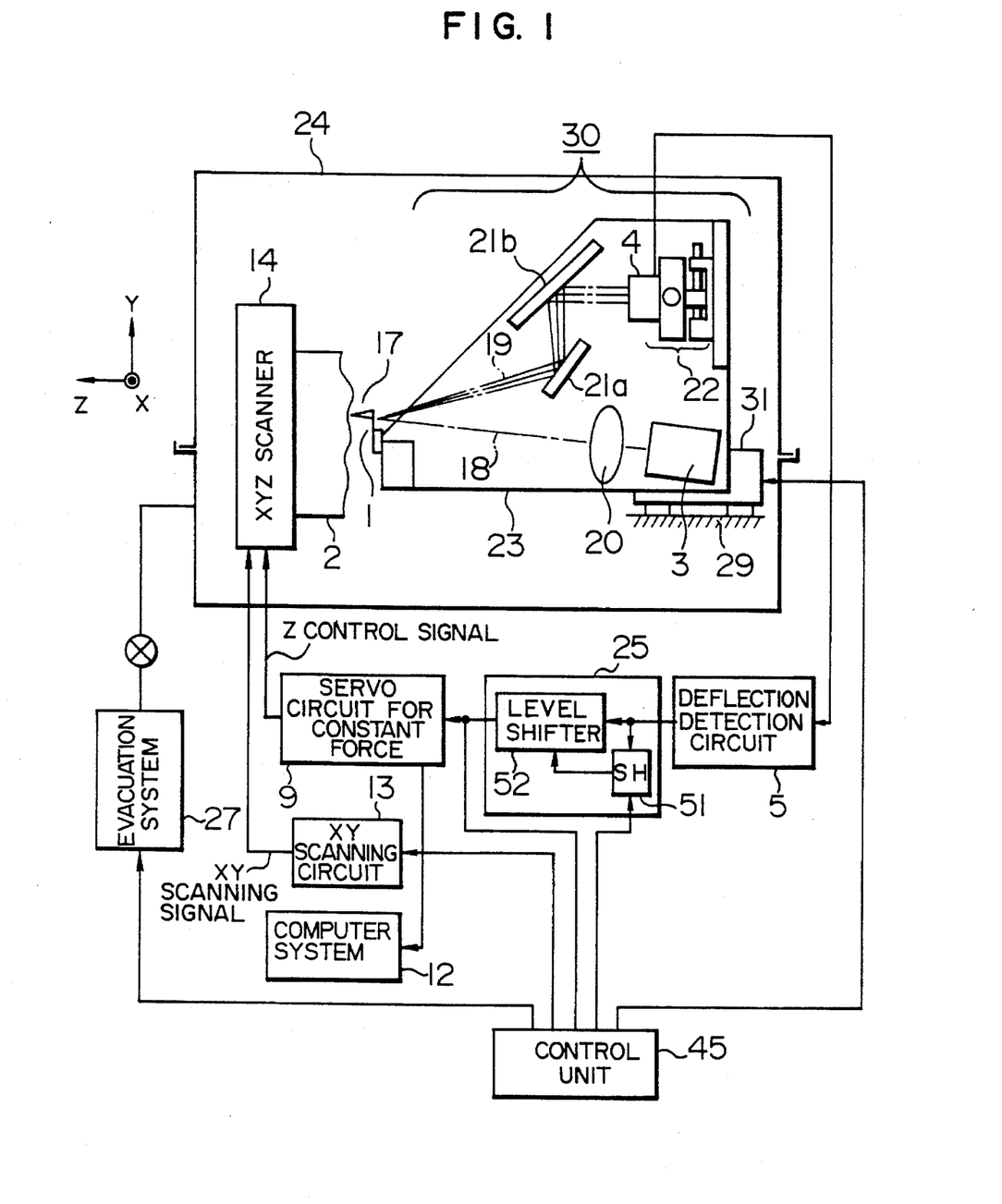
FIG. 1 is a block diagram showing an atomic force microscope according to an embodiment of the invention.

A configuration of the atomic force microscope according to an embodiment of the invention is shown in FIG. 1. This apparatus is configured basically in such a manner as to enable the sample to be observed in vacuum.

A cantilever 1 having a stylus 17 at the forward end thereof is mounted on a probe base 23 to form a probe. The probe base 23 has a laser beam deflection detector 30 mounted thereon. A sample 2 providing an object of observation is placed on an XYZ scanner 14 and is arranged in such a position that the object surface of observation is located close to the stylus 17. The probe base 23 is supported on a table 29 through an inchwormmechanism 31. As the inchworm mechanism 31 is driven, the probe is set in position along Z axis. The Z axis is perpendicular to the surface of the object of observation. The XYZ scanner 14 is supported on a table 29 through a rough positioning micrometer. The table 29 in turn is mounted on the apparatus base through a vibration dissipating mechanism. The apparatus base, the vibration dissipating mechanism and a rough positioning micrometer are not shown. These mechanisms are installed in a vacuum housing 24. Specifically, the sample 2 is mounted on the XYZ scanner 14, after which the evacuation system 27 is activated to observe the surface of the sample 2 in a vacuum. A control unit 45 produces a control signal for controlling the various parts of the apparatus.

The laser beam deflection detector 30 detects the deflection in enlarged form of the cantilever which is caused when a force is applied to the stylus 17 at the forward end of the cantilever 1. More specifically, the laser beam 18 emitted from a semiconductor device 3 and collimated at a focusing lens 20 irradiates the back side of the cantilever 1. The laser beam 19 reflected from the back side of the cantilever 1 is reflected on mirrors 21a, 21b and enters the light position detector 4. The light position detector 4 has two current outputs, the ratio between which is dependent on the position of the light entering the light position detector 4. A deflection detection circuit 5 receives the two current outputs and converts them into a deflection detection signal having a voltage proportional to the deflection of the reflected beam 19 from a reference point. The magnification of the laser beam deflection optical system is approximately ×1000, and the positional change of 1 Å of the stylus 17 is represented by about 0.1 μm on the light-receiving surface 4 of the light position detector. A position change on the order of less than 1 Å can thus be detected. The light position detector 4 is mounted on the detector base 23 through a positioning micrometer 22, whereby the very position of the light position detector 4 can be adjusted.

The XYZ scanner 14 is a tripod piezoelectric scanner, for example. The XYZ scanner 14 includes an X-axis piezoelectric element and a Z-axis piezoelectric element. The sample 2 is mounted on the movable end driven by the piezoelectric elements. The X piezoelectric element and the Y piezoelectric element are controlled by an XY scanning circuit 13, so that the position of the sample 2 is two-dimensionally scanned in such a manner as to allow the stylus 17 to scan the object region of observation of the sample. The Z-axis piezoelectric element is used for servo control to keep constant the repulsive force generated between the stylus 17 at the forward end of the cantilever 1 and the sample surface. More specifically, the deflection detection signal produced at the deflection detection circuit 5 has the voltage thereof corrected at a signal compensation circuit 25 and is introduced to the servo circuit 9. The servo circuit 9 generates a Z-axis control signal in such a manner that the corrected level of the deflection signal gives a set reference level, thereby driving the Z-axis piezoelectric element. As a result, the position along Z axis of the sample 2 is controlled finely to keep constant the amount of deflection of the reflected beam detected at the light position detector, and hence, the deflection of the cantilever 1. Soft contact drive is thus carried out for keeping constant the repulsive force generated between the stylus 17 and the sample surface. If the soft contact drive is to be made possible, two conditions are required to be met: One is that the deflection detection signal applied to the servo circuit 9 properly reflects the repulsive force generated between the stylus 17 and the sample surface, and the other is that the Z-axis piezoelectric element is driven within the limit of elongation control. In order to meet these two conditions, the signal compensation circuit 25 and the inchworm mechanism 31 are used. The functions of these components are described in detail below.

Figure 2A:
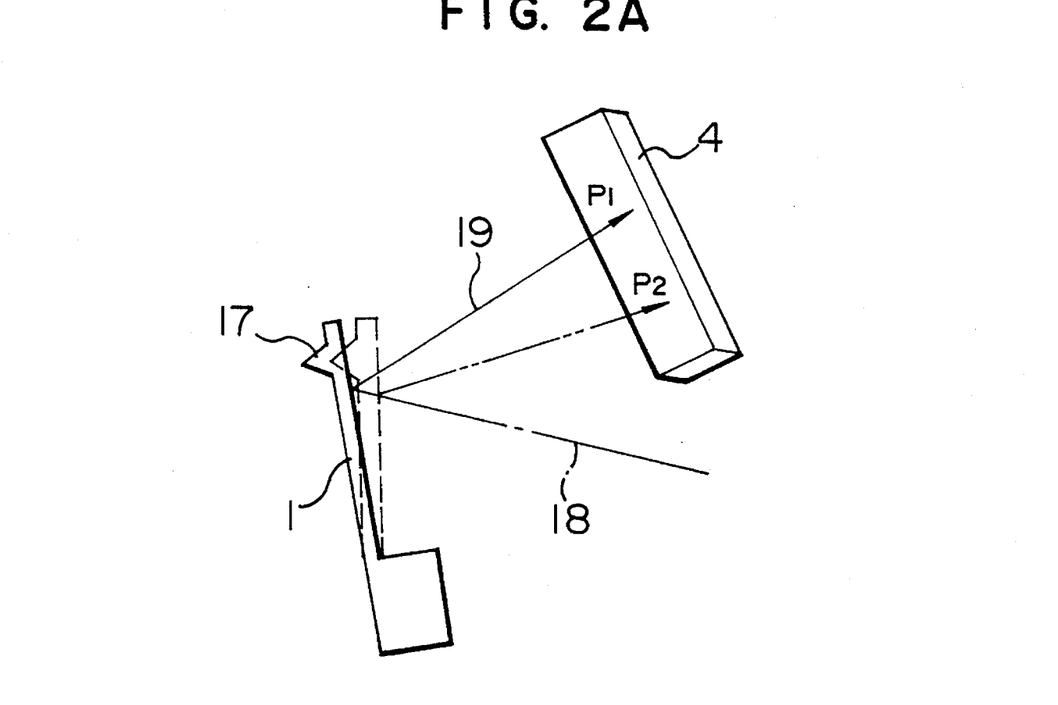
FIG. 2A is a model diagram showing the manner in which the cantilever is deflected at the time of evacuation according to the same embodiment.
Figure 2B:
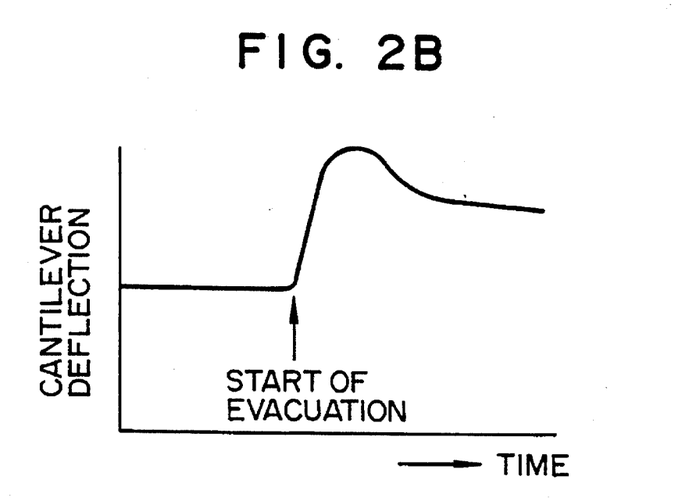
FIG. 2B is a characteristic diagram showing the lapse of time during which the cantilever is deflected.

The deflection in the free standing state of the cantilever 1 mounted on the laser beam deflection detector 30 is varied. The output voltage of the deflection detection circuit 5 with the cantilever 1 in free standing state also varies depending on the error in mounting the cantilever 1. Further, evacuation of the interior of the vacuum housing 24 changes the deflection of the cantilever in free standing state, for example, in the manner as shown in FIG. 2. In FIG. 2A, the position of the cantilever 1 in atmosphere is shown by solid line, and the deflection after evacuation by dashed line. This change is by reason of the fact that the heat dissipation of the cantilever 1 irradiated with the laser beam 18 greatly varies between atmosphere and vacuum, resulting in a corresponding temperature change of the cantilever 1. As a result, the laser beam 19 reflected shifts from point P1 to P2. FIG. 2B represents this change with time as an output voltage of the deflection detection circuit 5. In this way, the output voltage of the deflection detection circuit 5 undergoes a sharp change at the initiation of evacuation, and subsequently tends to restore the original value but converges to a level different from the value in atmosphere. This change is different for different types of cantilever 1. In any case, the output voltage of the deflection detection circuit 5 is required to be corrected in accordance with the level of the deflection detection signal with the cantilever in free standing state. According to the embodiment under consideration, a signal compensation circuit 25 is used for electrical correction.

The signal compensation circuit 25 includes a sample-and-hold circuit 51 supplied with the output voltage of the deflection detection circuit and a level shift circuit 52 for shifting the level of the output voltage of the deflection detection circuit 5 by the output voltage of the sample-and-hold circuit 51 and producing the resulting voltage. First, the inchworm mechanism 31 is operated in such a manner that the detector base 23 comes away from the sample 12 not to exert any repulsive force between the stylus 17 and the surface of the sample. In other words, the cantilever 1 is set in free standing state. Under this condition, the sample-and-hold circuit of the signal compensation circuit 25 is energized for a sampling operation. As a consequence, the output of the signal compensation circuit 25 is shifted in level, and the input of the servo circuit 9 is corrected to assume a baseline level (zero volt according to the embodiment) when the repulsive force actually exerted on the stylus 17 is zero. In this manner, correction (calibration) by the signal compensation circuit 25 is completed. As the next step, the detector base 23 is fed out in the forward direction by a predetermined length by the inchworm mechanism 31. The servo circuit 9 produces a Z-axis control signal so that the level of the corrected deflection detection signal from the signal compensation circuit 25 assumes a set reference level, and thus drives the Z-axis piezoelectric element of the XYZ scanner 14. The soft contact drive is thus carried out properly for maintaining a constant repulsive force between the stylus 17 and the surface of the sample. The XY scanning circuit 13 is driven and the sample 2 is two-dimensionally scanned under this condition. The Z-axis piezoelectric element of the XYZ scanner 14 is controlled in such a way as to copy the surface contour of the sample 2, thus making it possible to obtain information along the height of the sample 2 from the control voltage. Further, a three-dimensional image of the surface of the sample 2 is produced by application of the values of X, Y, Z to the computer system 12.

The timing of correction will be explained. According to the embodiment under consideration, the above-mentioned correction is effected each time the sample is set and the vacuum housing is evacuated. Specific processes of operation for correction will be described more in detail later. Generally, after evacuation of the vacuum housing, on the other hand, the area of observation or the conditions including the settings of repulsive force between the stylus 17 and the sample surface are changed to repeat the observation a plurality of times. The environment of the cantilever 1 undergoes a sharp change upon evacuation of the vacuum housing. Taking into consideration the time required for the deflection to converge in free standing state, therefore, it is desirable to execute observations a plurality of times upon evacuation of the vacuum housing and observe the sample between corrections. After the lapse of a predetermined length of time following evacuation, subsequent observations may be repeated without any corrective operation.

The sample is sometimes observed without any evacuation. Also, a scanning probe microscope exists which lacks the evacuation system 27 and the vacuum housing 24 in the configuration of FIG. 1. Even in such an apparatus, the deflection of the cantilever may change when the sample to be observed or the atmospheric temperature is changed. The above-mentioned correction should effectively be carried out each time a new sample is set before observation.

In order to cope with secular variations of the component parts of the apparatus, a timer is preferably incorporated in the apparatus for accumulating the operating time of the apparatus or the absolute time and to carry out the correction each time the time accumulation reaches a predetermined value.

In addition to the electrical method of correcting the error of the deflection detection signal attributable to the cantilever deformation, a mechanical method is available. This is the method by which the position of the light position detector 4 is moved along Y direction by the positioning micrometer 22 in such a way that the output of the deflection detection circuit 5 assumes a baseline level. The advantage of the electrical correction using the signal compensation circuit 25 is that it is simpler than the mechanical correction and can be effected automatically. Since it is difficult to assure positional accuracy of less than 1 µm mechanically, the correction which may be effected by the positioning micrometer 22 often requires the electrical correction in addition. For using the positioning micrometer 22 for correcting the input signal of the servo circuit for constant force to meet the environmental change of the cantilever due to evacuation, the positional micrometer 22 must be operable from outside of the vacuum housing 24. In the apparatus configuration including the signal compensation circuit 25 as according to the embodiment described above, however, the positioning micrometer 22 may be operable only after removing the vacuum housing 24. In this case, it is desirable to correct the signal by operation of the positioning micrometer before evacuation, and then, it is effective electrically to correct by the signal correction circuit 25 after evacuation. In any apparatus configurations, it is more practical to carry out the correction solely by the deflection signal compensation circuit 25 at short time intervals, and by the positioning micrometer 22 added at long time intervals.

Figure 3A:
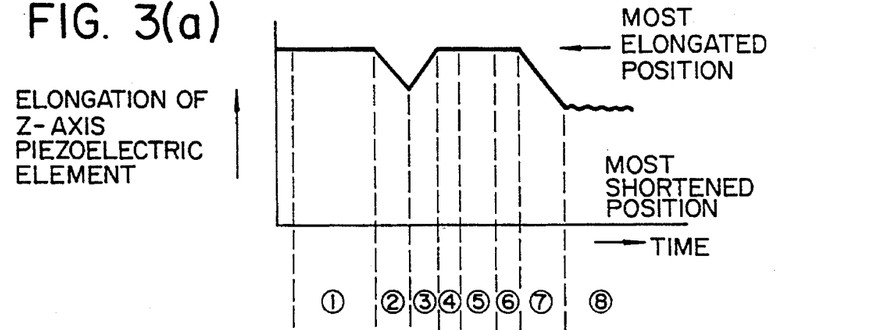
FIGS. 3a–3c is a time chart for explaining the automatic correction operation according to the same embodiment.
Figure 3B:
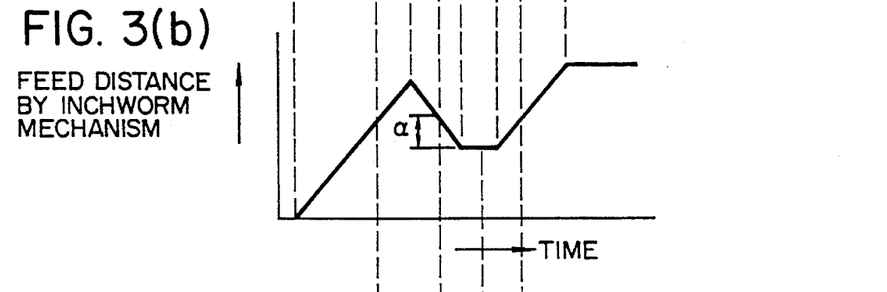
Figure 3C:
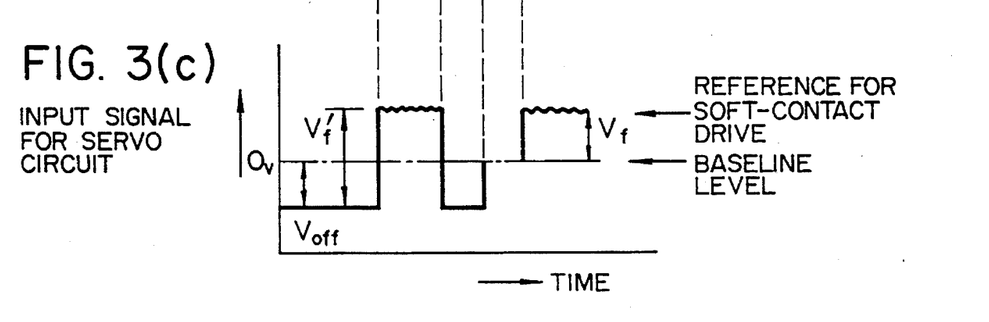

Now, a specific process for correcting the level of the deflection detection signal with the sample 2 changed will be explained with reference to FIG. 3. FIG. 3A shows a chronological change of the elongation of the Z-axis piezoelectric element of the XYZ scanner, FIG. 3B a chronological change of the feed distance of the detector base 23 by means of the inchworm mechanism 31, and FIG. 3C a chronological change of the input signal to the servo circuit 9. The correcting operation, which is carried out according to the steps ① to ⑧, corresponds to the time divisions ① to ⑧ in FIG. 3.

① First, the probe base 23 is fed forward continuously by the inchworm mechanism 31. The detector base 23 is thus moved along Z direction. In initial conditions, the stylus 17 is located sufficiently away from the surface of the sample 2, and therefore the input signal to the servo circuit 9 should assume a baseline level (zero volt in the case of FIG.3) indicating that the force applied between the stylus 17 and the sample surface is zero. Due to the deformation of the cantilever 1, however, the force assumes the value of Voff. When the stylus 17 reaches the surface of the sample 2, the input signal to the servo circuit 9 becomes substantially equal to the reference level Vf as shown due to the servo control for constant force.

② The inchworm mechanism 31 is operated further for a predetermined length of time thereby to feed the probe base 23 in forward direction even more. With the forward movement of the detector base 23, the elongation of the Z-axis piezoelectric element of the XYZ scanner is progressively reduced from maximum elongation by the constant-force servo control.

③ As the next step, the direction in which the inchworm mechanism 31 is driven is reversed to withdraw the detector base 23. The amount of elongation of the Z-axis piezoelectric element of the XYZ scanner 14 is increased to maximum. The reversal of the driving direction of the inchworm mechanism 31 can be automatically effected by a monitor of the input signal level of the servo circuit 9, for example. Specifically, a timer is included in the control unit 45 for monitoring the time lapse from the point when the input signal of the servo circuit 9 has reached the vicinity of Vf, so that the direction of driving the inchworm mechanism 31 is automatically reversed when the time lapse reaches a predetermined value. During the period when the constant-force servo control effectively functions with the stylus 17 pressed against the surface of the sample 2 (② and ③ in FIGS. 3A to 3C), the force actually exerted on the stylus 17 corresponds to the level difference Vf' between Voff and Vf although feedback control is effected with the voltage Vt as a reference level.

④ Even after the Z-axis piezoelectric element is elongated to maximum, the withdrawal by the inchworm mechanism 31 is continued and the stylus 17 is moved further away from the point d by which it is distant from the sample 2. The distance d is such that the effect of the force from the surface is negligible and is specifically at least 2 μm. This withdrawal operation can be stopped automatically by the timer described above.

⑤ The stylus 17 is fixed at this position and the input signal to the constant-force servo circuit 9 is corrected. Specifically, the input signal is shifted in level by Voff and is corrected to a baseline level (zero volt in FIG. 3). As explained above, the correction is made automatically and quickly by performing the sampling operation of the sample-and-hold circuit 51 of the signal compensation circuit 25. Alternatively, the correction may be made by manual operation of the positioning mechanism 22, if so operable.

⑥ After complete correction, the feeding operation of the inchworm mechanism 31 is resumed. When the stylus 17 reaches the surface of the sample 2 again, the servo 9 begins to function effectively, and the input signal to the servo circuit 9 reaches the reference level Vf again. The force exerted on the stylus 17 is equivalent to the reference level Vf set appropriately.

⑦ Even after the stylus 17 has reached the surface of the sample 2, the feeding operation is continued by the inchwormmechanism 31 to reduce the amount of elongation of the Z-axis piezoelectric element of the XYZ scanner 14.

⑧ When the Z-axis piezoelectric element is elongated by a proper amount, the feeding operation of the inchworm mechanism 31 is stopped to fix the position of the probe base 23. As a result, the preparatory process is completed for observing the sample surface by two-dimensional scanning of the sample 2 within the XY plane. Normally, the feeding operation is most preferably stopped when the amount of elongation of the Z-axis piezoelectric element reaches about the central value of the elongation control range. The operation for fixing the probe base 23 at the proper position can also be performed automatically by a timer installed on the control unit 45. Specifically, the timer is energized as the input signal level of the servo circuit 9 reaches the proximity of Vf again, and upon the lapse of a predetermined length of time thereafter, the feeding operation of the inchworm mechanism 31 is stopped.

The aforementioned process of operation makes possible the preparatory operation for sample observation including the error correction of the constant-force control caused by the deflection of the cantilever on the one hand and feeding of the probe base to proper position on the other hand. Especially, the execution of the preparatory operations shown in FIGS. 3A to 3C by automatic sequence control on the control unit 45 considerably shortens the time from correction of the input signal of the servo circuit 9 to the start of sample observation. Consequently, a reliable three-dimensional data on the sample can be obtained even in a harsh environment accompanied by sharp changes such as at the time of evacuation.

Figure 4:
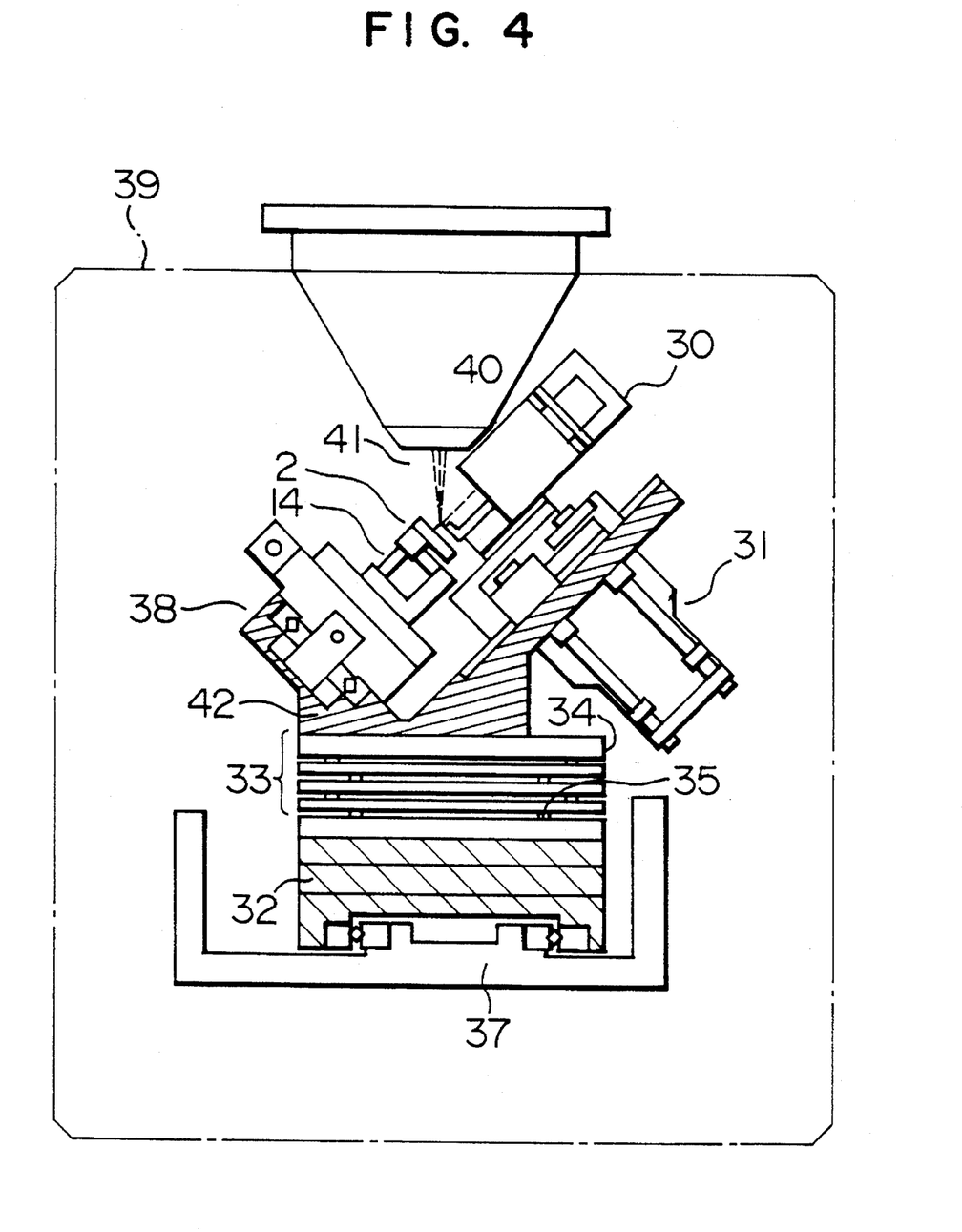
FIG. 4 is a partial sectional view showing the essential parts of another embodiment with an atomic force microscope built in the sample stage of a scanning electron microscope.

FIG. 4 shows the essential parts of another embodiment in which an atomic force microscope (AFM) unit is built in the sample stage of the scanning electron microscope (SEM). The SEM base 37 has sequentially laid thereon an SEM XY positioning micrometer 32, a vibration dissipating mechanism 33 with a metal plate 34 and a rubber-like soft damper 35 laid thereon, and an AFM base 42 fixed with an AFM unit. This assembly is mounted on a vacuum flange 39. The AFM unit includes a laser beam deflection detector 30 having a stylus, an inchworm mechanism 31 for feeding the detector 30 toward or withdrawing from the sample 2, an XYZ scanner 14 for supporting and scanning the sample 2, and an XY positioning micrometer 38 for selecting the field of view in the AFM by moving the scanner 14 in XY directions. The bottom of the AFM base 42 is parallel to the SEM base 37 and is perpendicular to the axis of the electron beam 41 emitted from the object lens 40. The stylus 17 and the sample 2 can be observed under the SEM at the same time.

According to the embodiment under consideration, the configuration for processing data in the electronic circuits to drive the atomic force microscope (AFM) is exactly coincident with that of the embodiment shown in FIG. 1. Also, the operation for calibrating the error due to the cantilever deflection at the time of evacuation is the same for the two embodiments. The use of this SEM-AFM coupled system improves the selection accuracy of the area for AFM observation with a stylus remarkably as compared with the optical microscope, and makes possible the selection of the field of view on the order of submicrons. The evaluation of the forward end of the stylus 17 by SEM can also be made. Further, this system realizes simultaneous observation of an SEM image and an AFM image.

The embodiment represents a combination of an atomic force microscope and a scanning electron microscope. In addition, a similar combination is possible with a physical or chemical device utilizing vacuum such as a transmission electron microscope, a secondary ion mass spectrometer, an Auger electron spectrometer or an electron beam probe microanalyzer, or a semiconductor processing device such as a molecular beam epitaxy system, an electron beam lithography system, an ion implanting system or an electron beam metrology system.

Figure 5:
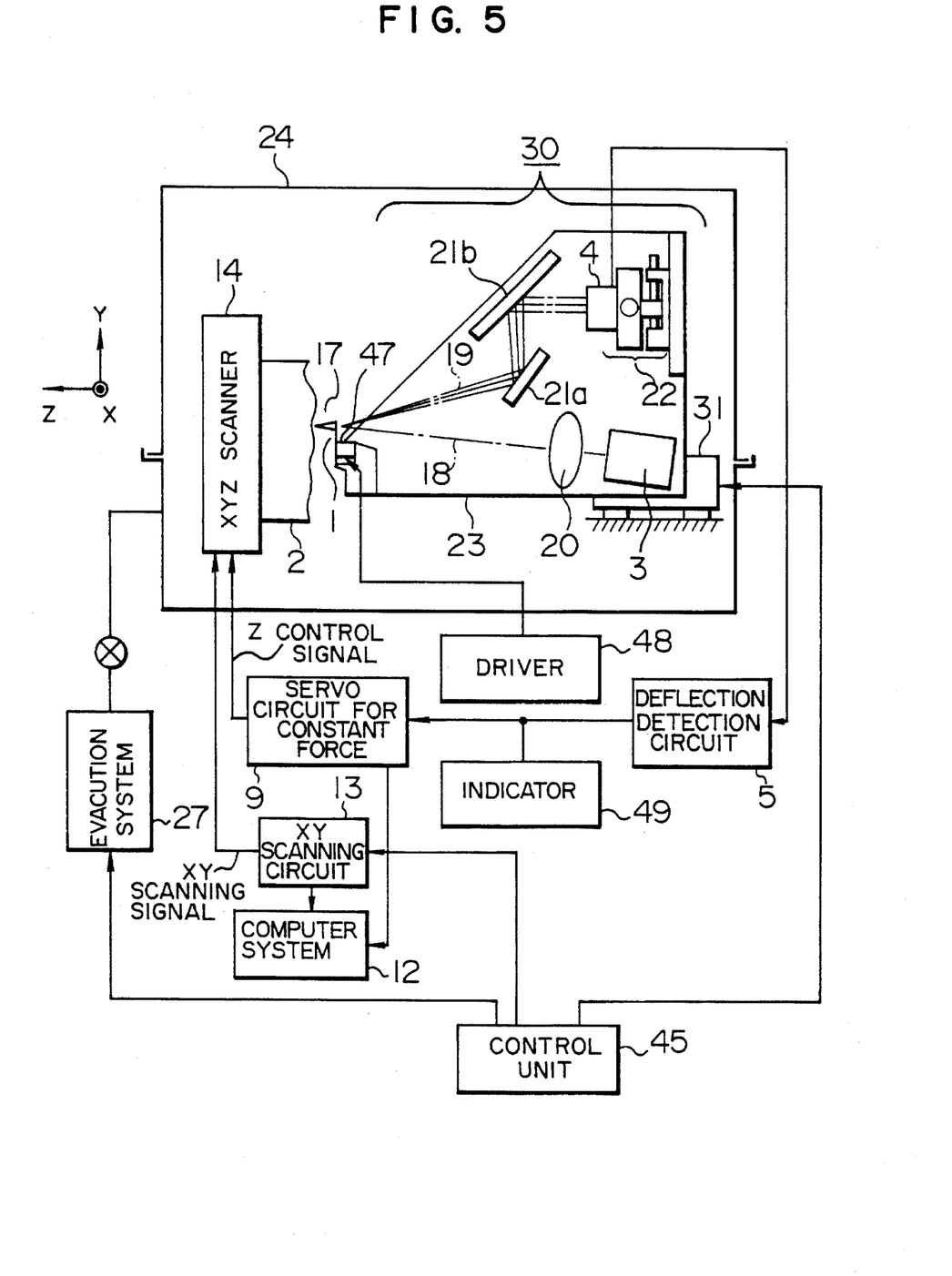
FIG. 5 is a block diagram showing still another embodiment.

Still another embodiment is shown in FIG. 5. The difference of the atomic force microscope according to this embodiment from the embodiment of FIG. 1 is that in the embodiment under consideration, the deflection signal compensation circuit 25 is omitted and the detection signal from the deflection detection circuit 5 is applied directly to a servo circuit 9. Also, in order to obviate the error of the constant-force servo control due to the deformation of the cantilever 1, the cantilever 1 is mounted on a probe base 23 through a piezoelectric device 47. Further, the present embodiment includes a drive circuit 48 for energizing the piezoelectric device 47 and a display unit 49 for indicating the output signal level of the deflection detection circuit 5. The remaining parts of the configuration are similar to those of the embodiment shown in FIG. 1, and those components parts shared with the embodiment of FIG. 1 are denoted by the same reference numerals as those in FIG. 1 respectively.

The deflection detection signal is calibrated in the embodiment of FIG. 5 in the following manner. As in the embodiment described above, first, the feed distance of the inchworm mechanism 31 is reduced to set the cantilever 1 in free standing state. Then, the output voltage of the drive circuit 48 is regulated to finely adjust the position of the cantilever 1. In the adjustment process, the output signal level of the deflection detection circuit 5 indicated on the display unit 49 is referenced to, and when the output signal level reaches a baseline, the output voltage of the drive circuit 48 is locked to complete the correction. In the case where the correction after evacuation is carried out by this method, the correction with the positioning micrometer 22 is recommended prior to evacuation as in the aforementioned embodiment.

Figure 6:
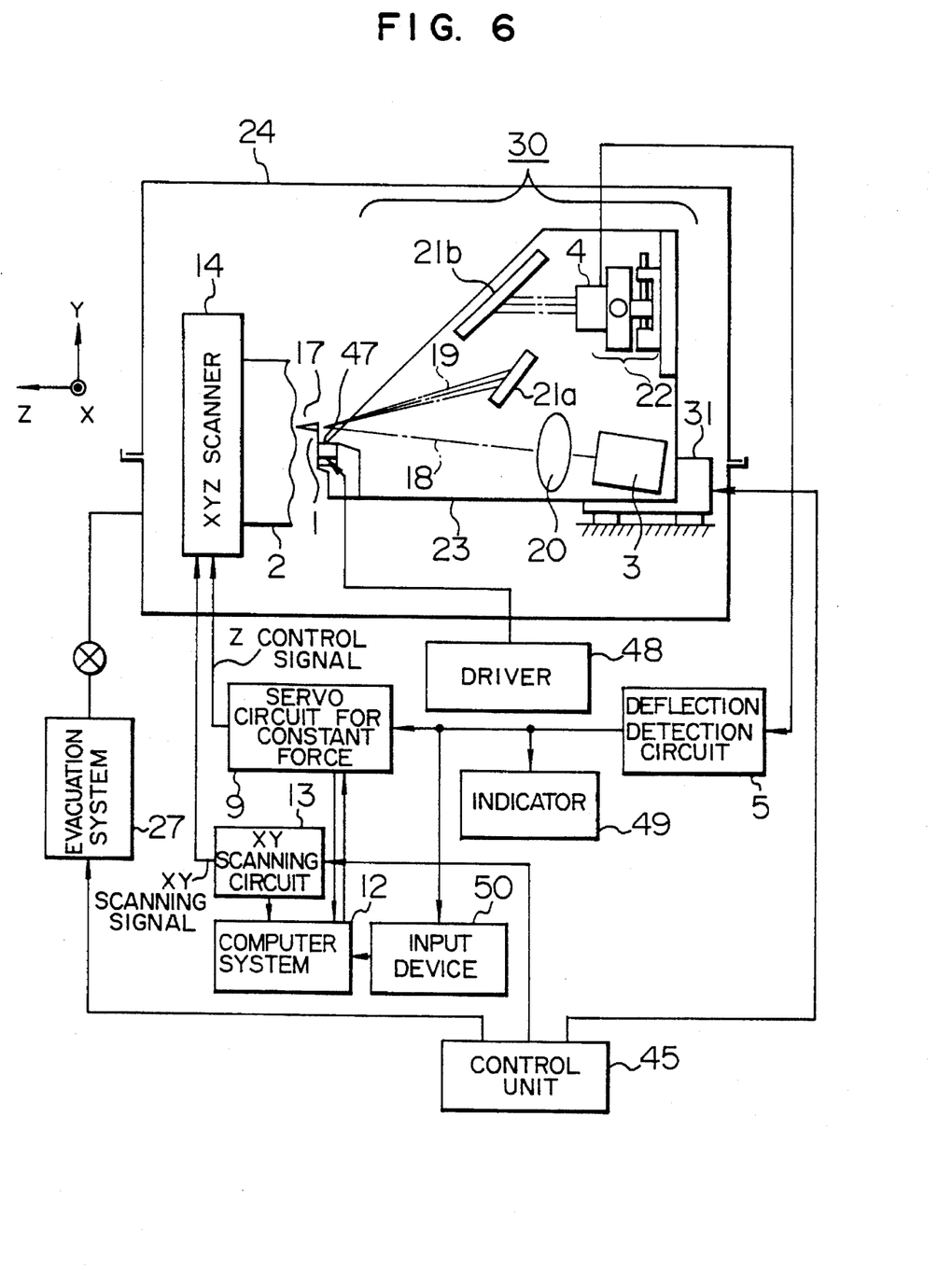
FIG. 6 is a block diagram showing a further embodiment.

A further embodiment of the invention is shown in FIG. 6. In the foregoing various embodiments, the level of the deflection detection signal is corrected in order to eliminate the error of the constant-force servo control attributable to the deformation of the cantilever 1. According to the embodiment shown in FIG. 6, however, the reference level Vf of the constant-force servo control is corrected. For this purpose, the reference level Vf of the constant-force servo control by the servo circuit 9 is calculated by a computer system 12 and is applied to the servo circuit 9. Also, the embodiment under consideration includes an input unit 50 for introducing the deflection detection signal produced from the deflection detection circuit 5 into the computer system 12. The remaining component parts are similar to those of the embodiment shown in FIG. 5, and all the component elements shared with the configuration of FIG. 5 are denoted by the same reference numerals as the corresponding parts in FIG. 5 respectively.

As in the preceding embodiments, first, the feed distance of the inchworm mechanism 31 is decreased to set the cantilever 1 in free standing state. Under this condition, the input unit 50 is activated, so that the deflection detection signal produced from the deflection detection circuit 5 is introduced into the computer system 12. Since the cantilever 1 is in free standing state, the level of the deflection detection signal should be at a baseline level (say, zero volt). If the cantilever 1 is deformed, however, the deflection detection signal thus introduced assumes a level Voff. The computer system 12 includes a register for storing the baseline level for the constant-force servo control, by which the contents of the register are rewritten into the value Voff. A new baseline level is thus set. The computer system 12 includes another register for storing the reference level Vft for the constant-force servo control in the absence of an error of the deflection detection signal. After rewriting a new baseline level, the computer system 12 calculates the sum of Vft and Voff, and applies the sum to the servo circuit as a new reference level Vf.

The foregoing operation effects correction equivalent to the level correction of the deflection detection signal. When the deflection detector 30 is fed forward by the inchworm mechanism 31 after the correction operation, the constant-force servo control by the servo control 9 accurately functions, so that the force exerted on the stylus 17 assumes a value accurately corresponding to Vft. Although the reference value for the servo circuit is corrected by the computer system according to the embodiment under consideration, an analog circuit may be used to realize an equivalent correction. In other words, the reference level can be corrected by a sample-and-hold circuit and a level shift circuit similar to the signal compensation circuit 25 shown in FIG. 1.

In order for the output signal level of the deflection detection circuit 5 to coincide exactly with a baseline level by the adjustment using the piezoelectric device 47 explained with reference to the embodiment of FIG. 5, a very fine adjustment is required. In contrast, the correction described with reference to the embodiment shown in FIG. 6 is effected automatically with accuracy. In the event that the value Voff is greatly displaced from the baseline level (zero volt), however, it is necessary to make the adjustment with the piezoelectric device 47 in advance as explained with reference to the embodiment of FIG. 5 and, after setting Voff within a tolerable range, to start the fetching of Voff into the computer system 12.

Figure 7:
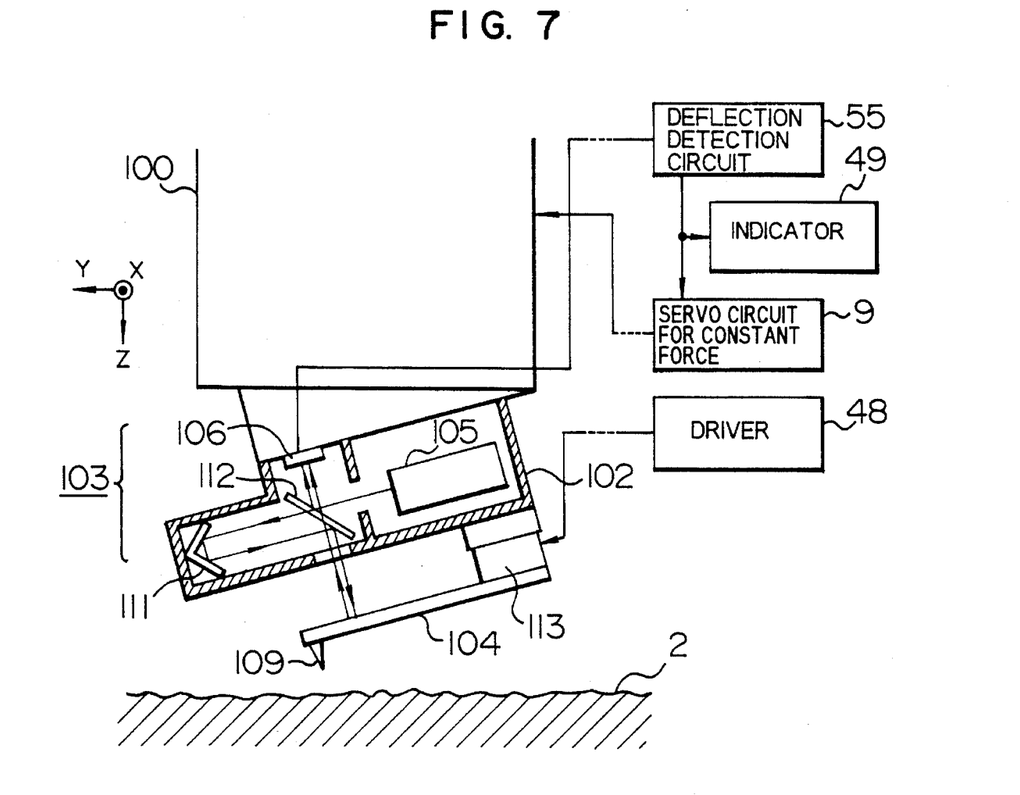
FIG. 7 is a block diagram showing a still further embodiment.

A still further embodiment is shown in FIG. 7. This embodiment provides an atomic force microscope using a deflection detector 103 of optical interference type for controlling the force exerted on the cantilever to a predetermined value. A probe base 102 for connecting the cantilever 104 having a stylus 109 to an XYZ scanner 100 has built therein a laser projector 105, a half mirror 112, a reflection mirror 111 and a photodiode 106. Part of the laser beam produced from the laser projector 105 is introduced to the photo-diode 106 by the half mirror 112. The laser beam that has passed through the half mirror 112 is reflected on the reflection mirror 111, reaches the half mirror 112 again, and is led to the cantilever 104. The laser beam, after being reflected on the cantilever 104, passes through the half mirror 112 and reaches the photo-diode 106. In the process, the laser beam (reference beam) initially led to the photo-diode 106 by the half mirror 112 and the laser beam reflected on the cantilever 104 interfere with each other. The photo-diode 106 is driven by the deflection detection circuit 55, the output signal of which represents the intensity of the light received by the photo diode 106. This output signal is applied to the servo circuit 9 as a deflection detection signal. The servo circuit 9 subjects to servo control the position of the probe base 102 in such a manner as to secure a constant deflection of the cantilever 104 by driving the Z-axis piezoelectric element of the XYZ scanner 100. Although not shown in FIG. 7, a positioner is used to finely adjust the relative distance between the sample and the probe. According to the embodiment under consideration, the force exerted on the stylus 109 is kept constant, the XYZ scanner 100 for two-dimensionally scanning the relative position of the stylus and the sample within the XY plane is arranged on the probe side, and the positioner for adjusting the distance in Z direction (feed distance) is located on the sample side. Nevertheless, the XYX scanner 100 and the positioner may alternatively be arranged either on the probe or sample side as desired.

Figure 8:
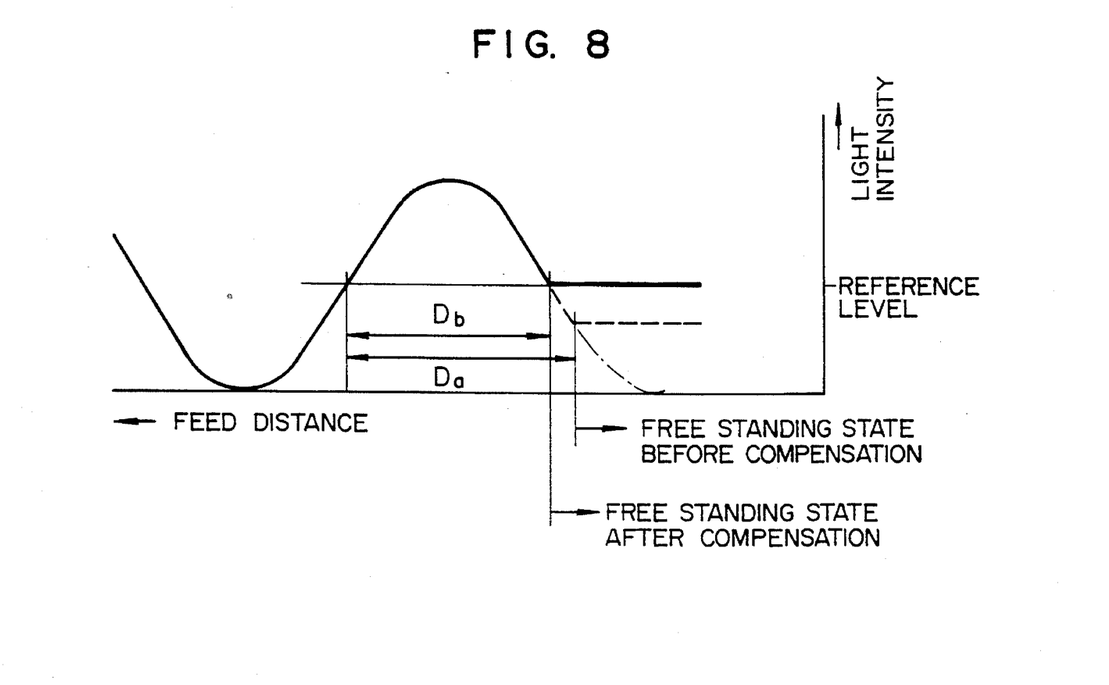
FIG. 8 is a diagram showing the control characteristic according to the embodiment of FIG. 7.

Explanation will be made about the change in intensity of the light received by the photo-diode 106 with the operation of the servo circuit 9 stopped and the sample 2 fed gradually toward the stylus 109. As far as the sample 2 and the stylus 109 are located distant from each other and the cantilever 104 is in free standing state, the intensity of the received light is constant. With the increase in feed distance and the deflection of the cantilever 104 due to the repulsive force applied to the stylus 109, however, the phase difference between the laser beam reflected on the cantilever 104 and the reference beam undergoes a change thereby to change the intensity of the received light. This change in light intensity is along a sine wave plotted against the increase in the feed distance, or more accurately, the deflection of the cantilever surface irradiated with the laser beam. The period of this sine wave is equal to the wavelength of the laser beam. As shown by solid line in FIG. 8, the intensity of the received light is adjusted at a value intermediate the maximum and minimum intensities with the cantilever 104 in free standing state. When the light intensity approaches the intermediate value again after a light intensity change by feeding the sample, the sample is fixed and servo control effected by the servo circuit 9 and the Z-axis piezoelectric device with the intermediate value as a reference level. In this way, the deflection of the cantilever 104 can be controlled to Db which is one half the wavelength of the laser beam. Although the repulsive force exerted on the stylus 109 can be controlled to constant level, if the cantilever is deformed under a temperature change or the like cause and the intensity of light received by the photo-diode undergoes a change as shown by dashed line in FIG. 8 with the cantilever in free standing state, however, the servo control with the intermediate value as a reference level results in the repulsive force exerted on the stylus 109 assuming a value corresponding to the deflection shown by Da in FIG. 8.

According to the embodiment shown in FIG. 7, the cantilever 104 is mounted on the probe 102 through the piezoelectric device 113. The position of the cantilever 1 can be adjusted by controlling the piezoelectric device 113 using the output of the drive circuit 48. Also, the apparatus according to the embodiment comprises a display unit 49 for indicating the level of the deflection detection signal produced from the deflection detection circuit 55. Prior to observation of the sample 2, the sample 2 is withdrawn to set the cantilever 104 in free standing state. As the next step, the output voltage of the drive circuit 48 is adjusted for fine adjustment of the position of the cantilever 104. This adjustment is conducted while referring to the output signal level of the deflection detection circuit 55 indicated on the display unit 49. When the output signal level reaches a predetermined value (an intermediate value between maximum and minimum values equal to the baseline level set in the servo control 9 according to the embodiment under consideration), the output voltage of the drive circuit 48 is fixed. After this correction, the sample is fed out by a predetermined distance by the positioner and the servo control is started by the servo circuit 9. The repulsive force exerted on the stylus 109 can thus be controlled appropriately.

Various embodiments in which the present invention is applied to the surface microscope, or especially, to the atomic force microscope were described above. It will be obvious to those skilled in the art that the technique according to the invention is applicable to a wide variety of scanning probe microscopes in which the minor force generated between the stylus and the sample is controlled by utilizing the deflection of the cantilever. The operation for reading information is exactly the same as that of the scanning probe microscope. Further, the technique according to the invention can be applied to an apparatus comprising means for writing information in the surface of a medium. In this case, information can be written by the use of electric field evaporation, thermochemical operation, phase change by heat, thermomechanical operation, machining, injection of charges, inversion of vertical magnetism, etc. As a result, a file system of very high density is realized, and a highly accurate information processing operation can be performed by applying the invention to these systems.

It will thus be apparatus from the foregoing description that according to the invention, there is provided a scanning probe microscope in which variations of deflection of the cantilever with a stylus at the forward end thereof can be corrected, thereby realizing a very accurate constant servo control between the stylus and the sample surface. Consequently, observation and information processing are made possible with very high accuracy. Further, the change in deflection of the cantilever which may be caused at the time of evacuation can be corrected. Various ultrahigh vacuumerization systems and the scanning probe microscopes including the electron microscope can thus be combined effectively.

We claim:

1. A scanning probe microscope comprising:

a probe including a cantilever with a stylus at an end thereof and a probe base at another end thereof;

a scanning means driving at least one of said probe base and a sample arranged in proximity to said stylus to move relative positions of said stylus and a surface of said sample;

a driving means driving at least one of said probe base and said sample in order to adjust a distance between said stylus and the surface of said sample;

a control means controlling said driving means in accordance with a predetermined schedule;

an optical detector detecting a deflection of said cantilever;

a correction means, which comprises a sample and hold means correcting an output of said optical detector in accordance with an output of said sample and hold means; and a servo control means supplied with a corrected detection output of said optical detector from said correction means and controlling relative distances between said stylus and the surface of said sample thereby to control a force exerted between the surface of said sample and said stylus, wherein said control means schedules in such a manner so as initially to contact said stylus and the surface of said sample, then for a predetermined period, to leave at least a distance between said stylus and the surface of said sample by which said stylus is substantially not affected by any force from the surface of said sample, and said sample and hold means samples and holds an output of said optical detector when said stylus is substantially not affected by any force from the surface of said sample, and then to contact said stylus and the surface of said sample again.

2. A scanning probe microscope according to claim 1, wherein said cantilever is held on said probe base through a piezoelectric element, and said correction means includes an adjusting means adjusting a selected one of a position and style of said cantilever against said probe by use of said piezoelectric element.

3. A scanning probe microscope according to claim 1, wherein said deflection detection means includes a laser projector irradiating a laser beam on said cantilever and a light position detector detecting a deflection of the laser beam reflected from said cantilever, and said correction means includes a positioning means adjusting a position of said light position detector.

4. A scanning probe microscope according to claim 1, wherein said deflection detection means includes a laser beam projector irradiating a laser beam on said cantilever and a light detector detecting an interference light between the laser beam reflected from said cantilever and a predetermined reference laser beam.

5. A scanning probe microscope according to claim 1, wherein said scheduled operation is repeated when said sample is changed.

6. A scanning probe microscope according to claim 1, wherein said scheduled operation is repeated at regular intervals of time.

7. A scanning probe microscope according to claim 1, wherein said scheduled operation is repeated after evacuating an environment of said cantilever.

8. A scanning probe microscope according to claim 1, said scheduled operation is repeated a plurality of times after evacuating an environment of said cantilever.

9. A scanning probe microscope comprising:

a probe including a cantilever with a stylus at an end thereof and a probe base at another end thereof;

a scanning means driving at least one of said probe base and a sample arranged in proximity to said stylus and thereby moving relative positions of said stylus and a surface of said sample;

a driving means driving at least one of said probe base and said sample in order to adjust a distance between said stylus and the surface of said sample;

a control means controlling said driving means in accordance with a predetermined schedule;

an optical detector detecting a deflection of said cantilever;

a sample and hold means sampling and holding an output of said optical detector; and a servo control means which comprise a reference value for servo control and which is supplied with an output of said optical detector and controlling a relative distance between said stylus and the surface of said sample in such a manner that said reference value for servo control is corrected by an output of said sample and hold means so as to control a force exerted between the surface of said sample and said stylus, and wherein said control means schedules in such a manner so as initially to contact said stylus and the surface of said sample then for a predetermined period, to leave at least a distance between said stylus and the surface of said sample by which said stylus is substantially not affected by any force from the surface of said sample, and said sample and hold means samples and holds an output of said optical detector when said stylus is substantially not affected by any force from the surface of said sample, and then to contact said stylus and the surface of said sample again.

10. A scanning probe microscope according to claim 9, wherein said sample and hold means is included in a computer system for introducing an output of said optical detector.

11. A scanning probe microscope according to claim 9, wherein said scheduled operation is repeated when said sample is changed.

12. A scanning probe microscope according to claim 10, wherein said scheduled operation is repeated when said sample is changed.

13. A scanning probe microscope according to claim 9, wherein said scheduled operation is repeated at regular intervals of time.

14. A scanning probe microscope according to claim 10, wherein said scheduled operation is repeated at regular intervals of time.

15. A scanning probe microscope according to claim 9, wherein said scheduled operation is repeated after evacuating an environment of said cantilever.

16. A scanning probe microscope according to claim 10, wherein said scheduled operation is repeated after evacuating an environment of said cantilever.

17. A scanning probe microscope according to claim 9, wherein said scheduled operation is repeated a plurality of times after evacuating an environment of said cantilever.

18. A scanning probe microscope according to claim 10, wherein said scheduled operation is repeated a plurality of times after evacuating an environment of said cantilever.

19. A scanning probe microscope comprising:

a probe including a cantilever with a stylus at an end thereof and a probe base at another end thereof;

a scanning means driving at least one of said probe base and a sample arranged in proximity to said stylus to move relative positions of said stylus and a surface of said sample within a plane containing the surface of said sample to be observed;

a positioning means adjusting a distance between said stylus and the surface of said sample in a direction perpendicular to the plane containing the surface of said sample to be observed;

a control means controlling said driving means in accordance with a predetermined schedule;

an optical detector detecting a deflection of said cantilever;

a correction means, which comprises a sample and hold means, correcting an output of said optical detector in accordance with an output of said sample and hold means; and a servo control means supplied with a corrected detection output of said optical detector from said correction means controlling relative distances between said stylus and the surface of said sample thereby to control a force exerted between the surface of said sample and said stylus, wherein said control means schedules in such a manner so as initially to contact said stylus and the surface of said sample, then for a predetermined period to leave at least a distance between said stylus and the surface of said sample by which said stylus is substantially not affected by any force from the surface of said sample, and said sample and hold means samples and holds an output of said optical detector when said stylus is substantially not affected by any force from the surface of said sample, and then to contact said stylus and the surface of said sample again.

20. A scanning probe microscope comprising;

a probe including a cantilever with a stylus at an end thereof and a probe base holding said cantilever;

a scanning means moving said probe base and/or a sample arranged in proximity to said stylus and thereby changing relative positions of said probe and said sample within a plane containing the surface of said sample to be observed;

a positioning means adjusting a relative distance between said probe base and said sample in a direction perpendicular to the plane containing the surface of said sample to be observed:

a deflection detection means detecting deflection of said cantilever;

a correction means correcting a detection output of said deflection detection means;

a servo control means supplied with a corrected detection output of said deflection detection means and controlling the relative distance between said probe and said sample and thereby controlling a force exerted between said sample and said stylus; and a correction sequence control means setting said cantilever in a free standing state by driving said positioning means and activating said correction means;

wherein said correction sequence control means includes an activating means activating said correction means after evacuating an environment of said cantilever.

21. A scanning probe microscope comprising:

a probe including a cantilever with a stylus at an end thereof and a probe base holding said cantilever;

a scanning means moving said probe base and/or a sample arranged in proximity to said stylus and thereby changing relative positions of said probe and said sample within a plane containing the surface of said sample to be observed;

a positioning means adjusting a relative distance between said probe base and said sample in a direction perpendicular to the plane containing the surface of said sample to be observed;

a deflection detection means detecting deflection of said cantilever;

a correction means correcting a detection output of said deflection detection means;

a servo control means supplied with a corrected detection output of said deflection detection means and controlling the relative distance between said probe and said sample and thereby controlling a force exerted between said sample and said stylus; and a correction sequence control means setting said cantilever in a free standing state by driving said positioning means and activating said correction means;

wherein said correction sequence control means includes an activating means activating said correction means a plurality of times after evacuating an environment of said cantilever.

22. A scanning electron microscope within which a scanning probe microscope is provided, said scanning probe microscope comprising:

a scanning probe microscope comprising:

a probe including a cantilever with a stylus at an end thereof and a probe base at another end thereof;

a scanning means driving at least one of said probe base and a sample arranged in proximity to said stylus to move relative positions of said stylus and a surface of said sample;

a driving means driving at least one of said probe base and said sample in order to adjust a distance between said stylus and the surface of said sample;

a control means controlling said driving means in accordance with a predetermined schedule;

an optical detector detecting a deflection of said cantilever;

a correction means, which comprises a sample and hold means correcting an output of said optical detector in accordance with an output of said sample and hold means; and a servo control means supplied with a corrected detection output of said optical detector from said correction means controlling relative distances between said stylus and the surface of said sample thereby to control a force exerted between the surface of said sample and said stylus, wherein said control means schedules in such a manner so as initially to contact said stylus and the surface of said sample, then for a predetermined period, to leave at least a distance between said stylus and the surface of said sample by which said stylus is substantially not affected by any force from the surface of said sample, and said sample and hold means samples and holds an output of said optical detector when said stylus is substantially not affected by any force from the surface of said sample, and then to contact said stylus and the surface of said sample again.

23. A scanning probe microscope comprising:

a probe including a cantilever with a stylus at an end thereof and a probe base at another end thereof;

a scanning means driving at least one of said probe base and a sample arranged in proximity to said stylus and thereby moving relative positions of said stylus and a surface of said sample;

a positioning means adjusting a distance between said stylus and the surface of said sample in a direction perpendicular to the plane containing the surface of said sample to be observed;

a control means controlling said driving means in accordance with a predetermined schedule;

an optical detector detecting a deflection of said cantilever;

a sample and hold means sampling and holding an output of said optical detector; and a servo control means which comprises a reference value for servo control and which is supplied with an output of said optical detector and controlling a relative distance between said stylus and the surface of said sample in such a manner that said reference value for servo control is corrected by an output of said sample and hold means so as to control a force exerted between the surface of said sample and said stylus, wherein said control means schedules in such a manner so as initially to contact said stylus and the surface of said sample, then for a predetermined period, to leave at least a distance between said stylus and the surface of said sample by which said stylus is substantially not affected by any force from the surface of said sample, and said sample and hold means samples and holds an output of said optical detector when said stylus is substantially not affected by any force from the surface of said sample, and then to contact said stylus and the surface of said sample again.

24. A scanning probe microscope according to claim 23, wherein said sample and hold means is included in a computer system for introducing an output of said optical detector.

25. A scanning electron microscope within which a scanning probe microscope is provided, said scanning probe microscope comprising:

a probe including a cantilever with a stylus at an end thereof and a probe base at another end thereof;

a scanning means driving at least one of said probe base and a sample arranged in proximity to said stylus and thereby moving relative positions of said stylus and a surface of said sample;

a driving means driving at least one of said probe base and said sample in order to adjust a distance between said stylus and the surface of said sample;

a control means controlling said driving means in accordance with a predetermined schedule;

an optical detector detecting a deflection of said cantilever;

a sample and hold means sampling and holding an output of said optical detector; and a servo control means which comprises a reference value for servo control and which is supplied with an output of said optical detector and controlling a relative distance between said stylus and the surface of said sample in such a manner that said reference value for servo control is corrected by an output of said sample and hold means so as to control a force exerted between the surface of said sample and said stylus, wherein said control means schedules in such a manner so as initially to contact said stylus and the surface of said sample, then for a predetermined period, to leave at least a distance between said stylus and the surface of said sample by which said stylus is substantially not affected by any force from the surface of said sample, and said sample and hold means samples and holds an output of said optical detector when said stylus is substantially not affected by any force from the surface of said sample, and then to contact said stylus and the surface of said sample again.

26. A scanning probe microscope according to claim 9, wherein said sample and hold means is included in a computer system for introducing an output of said optical detector.

* * * * *